No. 660,248. Patented Oct. 23, 1900.
N. FOLEY.
UMBRELLA STICK.
(Application filed Mar. 22, 1899.)
(No Model.)
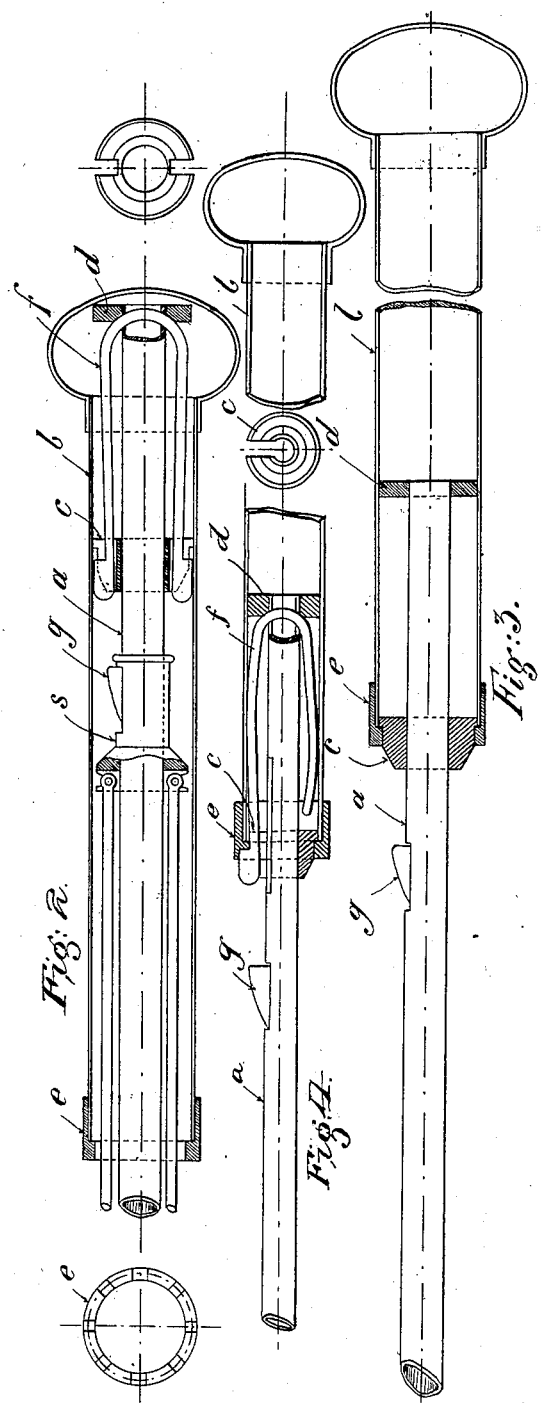
Witnesses
Inventor
Nelson Foley
by Alexander & Co
Attorneys

UNITED STATES PATENT OFFICE.

NELSON FOLEY, OF NAPLES, ITALY.

UMBRELLA-STICK.

SPECIFICATION forming part of Letters Patent No. 660,248, dated October 23, 1900.

Application filed March 22, 1899. Serial No. 710,210. (No model.)

*To all whom it may concern:*

Be it known that I, NELSON FOLEY, a citizen of Great Britain, residing at Naples, in the Isola di Gaiola, Kingdom of Italy, have invented certain new and useful Improvements in Umbrellas and Sunshades; and I do declare the following to be a full, clear, and exact description of the invention, such as will enable others skilled in the art to which it appertains to make and use the same.

This invention relates to improvements in umbrellas and sunshades of the class capable of being shortened so as to make them more convenient for packing or traveling or for being attached to cycles.

Figures 1, 2, and 3 illustrate the handle end constructed on my method for an umbrella, and Fig. 4 the same principle applied to a sunshade. Figs. 1, 2, 3, and 4 are longitudinal sections through the handles, Figs. 1 and 4 showing them extended and held in position by steel clips or catches. Fig. 3 shows a handle extended and a method which may be adopted for preventing the handle from being drawn completely off. Fig. 2 shows a handle shut in—viz., when the umbrella is shortened.

In Figs. 1, 2, 3, and 4, $a$ is the principal shaft of the umbrella or sunshade, preferably tubular, $b$ is the hollow tubular handle, $c$ and $d$ are washers soldered or otherwise fixed to the shaft to act as guides for the handle, but $c$ may also act as a stop to prevent the handle from being drawn off, $e$ being a ferrule soldered or fixed on the inner end of the handle for the same purpose. The ferrule $e$ also serves the purpose of engaging with the clips or spring-catches $f$, which are destined to maintain the handle in the extended position. The said spring-catch may be bent around and pass through a slit in the end of the shaft and be held firmly in place by the washer $d$. The ferrule $e$ on the inner end of the handle may be slotted on its rim in order that the spring-catch may engage in the notches to prevent the umbrella or parasol from turning around. $g$ is the usual catch in the shaft to keep the umbrella shut.

In an umbrella or sunshade constructed according to my invention the handle is made tubular, so that it can be run in over the radial arms when the umbrella or sunshade is shut up and over the movable sleeve, to which are attached the said arms. The shaft or main stick of the umbrella is preferably made of metal tube, and the running sleeve $s$ in Figs. 1 and 2 is made of such a form as to have the least possible diameter at the part where the radial arms are attached. The handle is prevented from being drawn completely off by some suitable means, such as that shown and described above.

In the case of an umbrella a double catch is preferred for keeping the handle extended as pressure comes on the handle when the article is used as a walking-stick. For parasols simple catches are considered sufficient.

By arranging the handle to slide over the stretchers instead of into the stick the strength of the stick is not impaired and a much more compact article is produced. A larger handle is possible, giving the hand a better grasp, while the stick may be small, and thus present a neater appearance. Moreover, by receiving the stretchers within the handle the latter assists in keeping the umbrella closed and will accomplish the result even if the runner-catch fails to work or gets broken.

In order to shorten the umbrella, it is only necessary, when the umbrella is shut up, to press the ends of the steel spring or catch by finger and thumb and then to push in the handle over the radial arms. In extending the handle it should be simply drawn out until it stops, then turned slightly around until the catch falls into one of the slots in the ferrule $e$, if the catch does, of itself, come opposite a slot in the first instance.

I claim—

1. In an umbrella or the like, the combination with a stick, of a U-shaped catch secured at its middle to the outer end thereof and having spring-arms lying on opposite sides of said stick, an inner washer adjacent to the ends of said arms and a tubular handle having on its inner end a ferrule provided with notches with which one or more of said arms can engage when the handle is drawn out.

2. In an umbrella or the like, the combination with a stick, of a washer secured to its outer end, a U-shaped catch secured to the stick adjacent to the washer and having spring-arms lying on opposite sides of the stick and extending inwardly along the same, an inner washer adjacent to the ends of said arms and a tubular handle fitted to slide over the washer and having a ferrule on its inner end projecting inwardly to engage with the ends of said arms and with said inner washer.

3. In an umbrella or the like, the combination with a stick, having an outer washer on its end, and a slotted inner washer a short distance therefrom, of a U-shaped spring-catch secured to the outer end of the stick and projecting through the slots in the inner washer, and a tubular handle fitted to slide over the washers, and to engage with the spring-catch and with the inner washer.

In testimony whereof I affix my signature in presence of two witnesses.

NELSON FOLEY.

Witnesses:
 JULIUS WOLFFSOHN,
 ASLAN D'ABRO DAGRATIDE.